Figure 1:
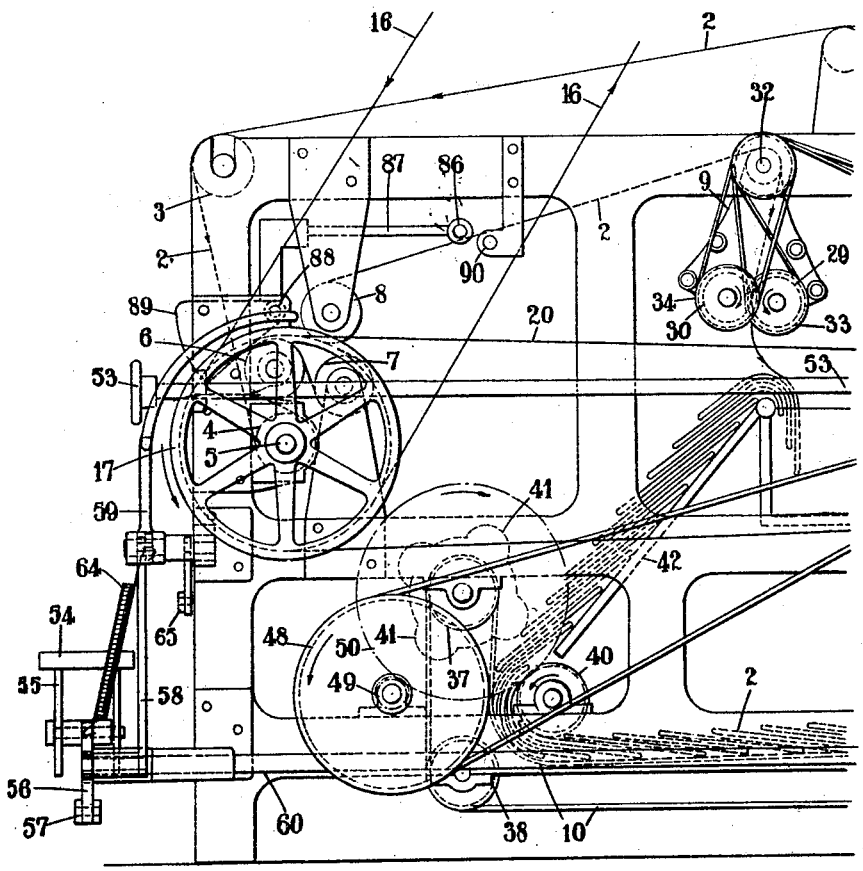

Aug. 4, 1925. 1,548,448
O. DREY ET AL
MACHINE FOR CUTTING WEFT PILE FABRICS
Filed Aug. 27, 1921 8 Sheets-Sheet 1

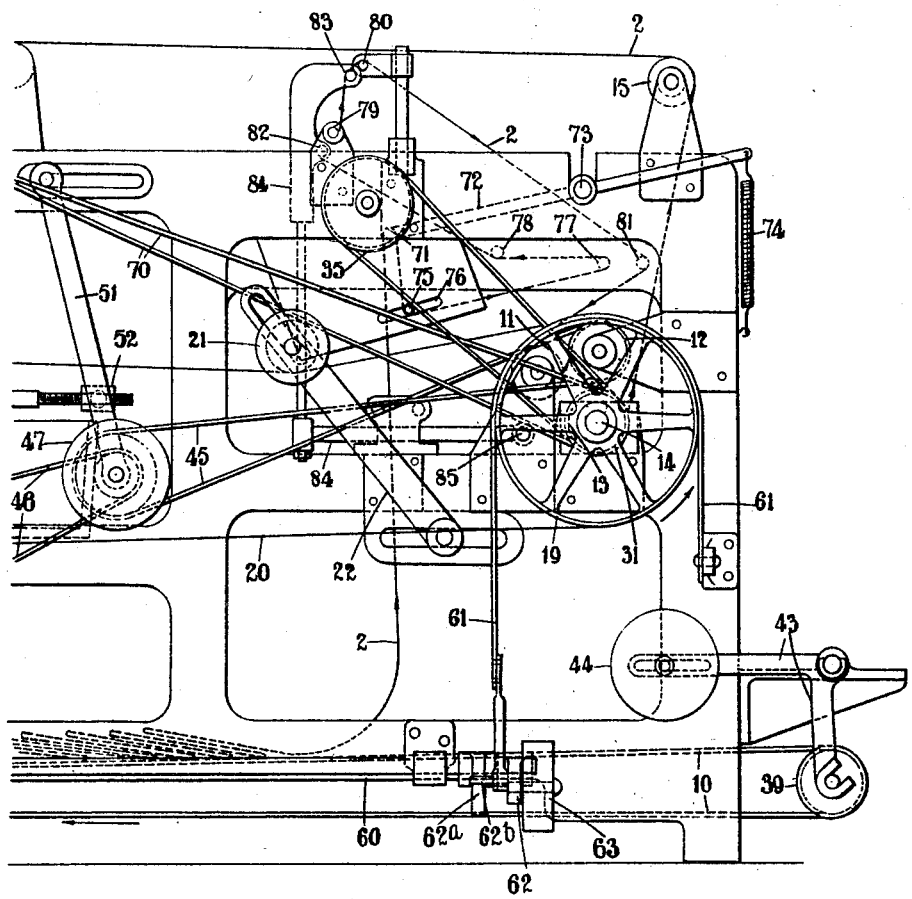

Aug. 4, 1925.  
O. DREY ET AL  
1,548,448  
MACHINE FOR CUTTING WEFT PILE FABRICS  
Filed Aug. 27, 1921   8 Sheets-Sheet 3

INVENTORS  
Oscar Drey  
and Hugh Linley Byrd.  
By Rosenbaum, Stockbridge & Borst,  
Attys.

Aug. 4, 1925.  
O. DREY ET AL  
MACHINE FOR CUTTING WEFT PILE FABRICS  
Filed Aug. 27 1921  
8 Sheets-Sheet 4  
1,548,448

INVENTORS  
Oscar Drey  
and  
Hugh Linley Byrd  
By Rosenbaum Stockbridge & Borst  
Attorneys Aug. 4, 1925.

O. DREY ET AL 1,548,448

MACHINE FOR CUTTING WEFT PILE FABRICS

Filed Aug. 27, 1921

8 Sheets-Sheet 5

INVENTORS
Oscar Drey
and Hugh Linley Byrd
By Rosenbaum, Stockbridge & Borst
Attorneys Aug. 4, 1925.

O. DREY ET AL 1,548,448

MACHINE FOR CUTTING WEFT PILE FABRICS

Filed Aug. 27, 1921  8 Sheets-Sheet 6

INVENTORS
Oscar Drey
and Hugh Lindley Byrd
By Rosenbaum, Stockbridge & Borst
Attorneys Aug. 4, 1925.

O. DREY ET AL 1,548,448

MACHINE FOR CUTTING WEFT PILE FABRICS

Filed Aug. 27, 1921    8 Sheets-Sheet 8

Patented Aug. 4, 1925.

1,548,448

UNITED STATES PATENT OFFICE.

OSCAR DREY AND HUGH LINLEY BYRD, OF STOCKPORT, ENGLAND.

MACHINE FOR CUTTING WEFT-PILE FABRICS.

Application filed August 27, 1921. Serial No. 495,902.

(GRANTED UNDER THE PROVISIONS OF THE ACT OF MARCH 3, 1921, 41 STAT. L., 1313.)

*To all whom it may concern:*

Be it known that we, OSCAR DREY and HUGH LINLEY BYRD, subjects of the King of Great Britain and Ireland, and residents of South Reddish, Stockport, in the county of Chester, England, have invented a certain new and useful Improvement in or Relating to Machines for Cutting Weft-Pile Fabrics (for which I have filed applications in Great Britain, Sept. 1, 1919; Belgium, July 30, 1921; Czechoslovakia, Aug. 1, 1921; France, Aug. 3, 1921; Poland, July 28, 1921; and Germany, July 26, 1921), of which the following is a specification.

This invention relates to machines for cutting weft-pile fabrics. The invention is especially applicable to machines of the kind wherein the fabric is operated upon in an endless condition and is at some point disposed, arranged or allowed to fall in folds, pleats or the like, which folds, pleats or the like are subsequently reversed by means of an endless creeper so that those made first may be unfolded first without interfering with the folds, pleats or the like made afterwards. The object of the invention is to provide an improved arrangement or construction of certain of the details of machines of the kind referred to with advantages hereinafter explained.

According to the first part of the invention, the fabric in its forward course through the machine is caused to serve as part of the means for driving or effecting the subsidiary motions thereof. This may be effected by driving the whole of the subsidiary motions of the machines in the forward travel of the fabric from a shaft or the like which is driven from the shaft or the like which effects the travel of the fabric, through means which alone are incapable of overcoming the load on the subsidiary shaft or the like and can only do so with the assistance of the fabric when there is no slack therein between the drawing rollers and the subsidiary driving shaft or the like.

According to another part of the invention, the accumulation of fabric that occurs when the travel is reversed is taken up near the uptake from the folds or pleats by an arrangement of stationary and movable rollers or bars in such a manner that at one or more points oppositely travelling portions of the fabric are brought into contact with each other.

According to another part of the invention, the creeper instead of being of lattice construction as hitherto, is composed of a number of endless cords passing over suitably arranged rollers, or of a single endless cord appropriately wound over the rollers.

Figure 2:
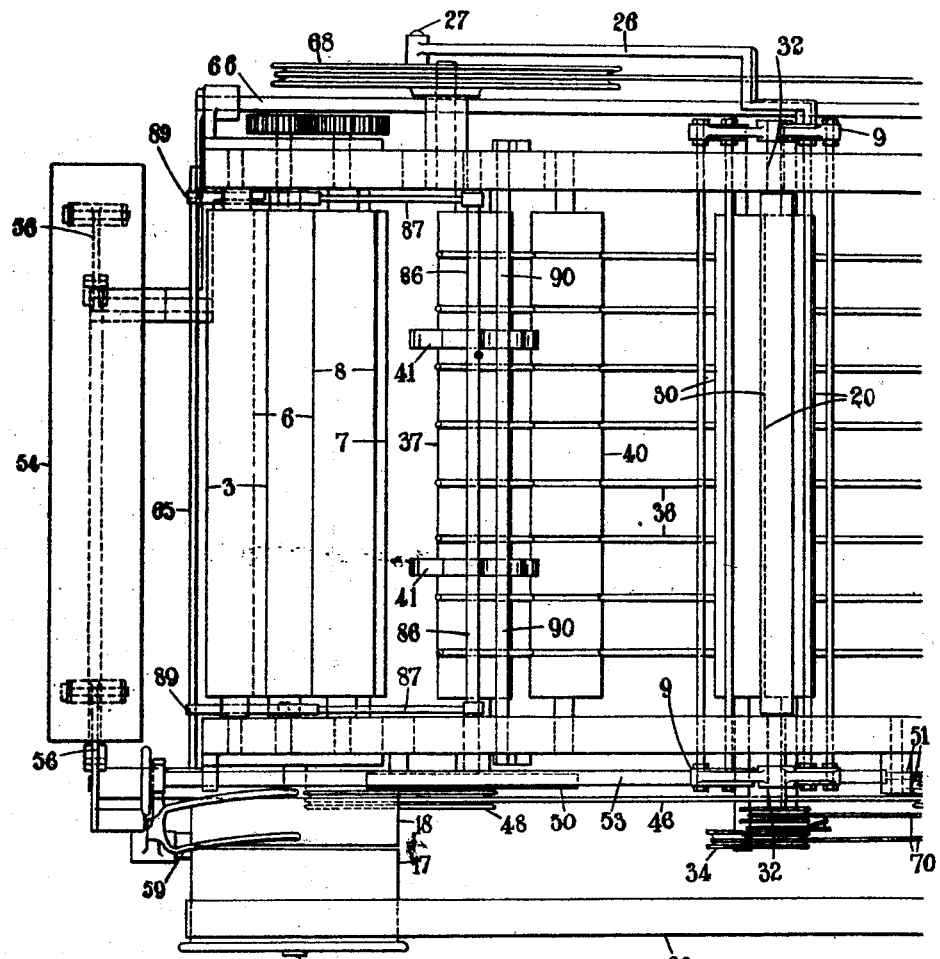
Figure 3:
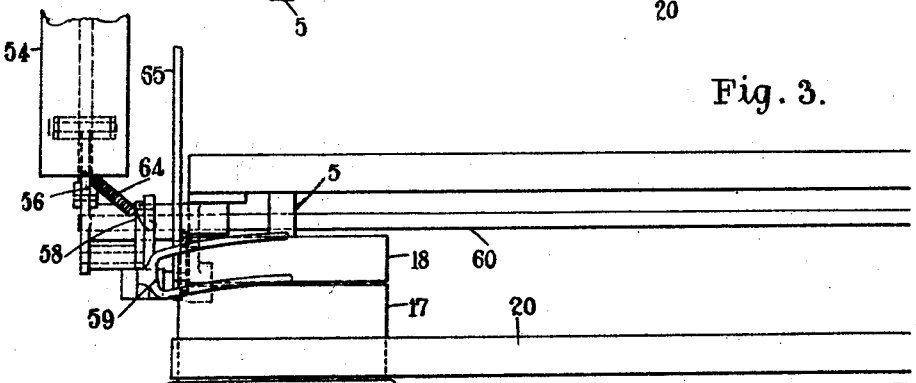
Figure 2:
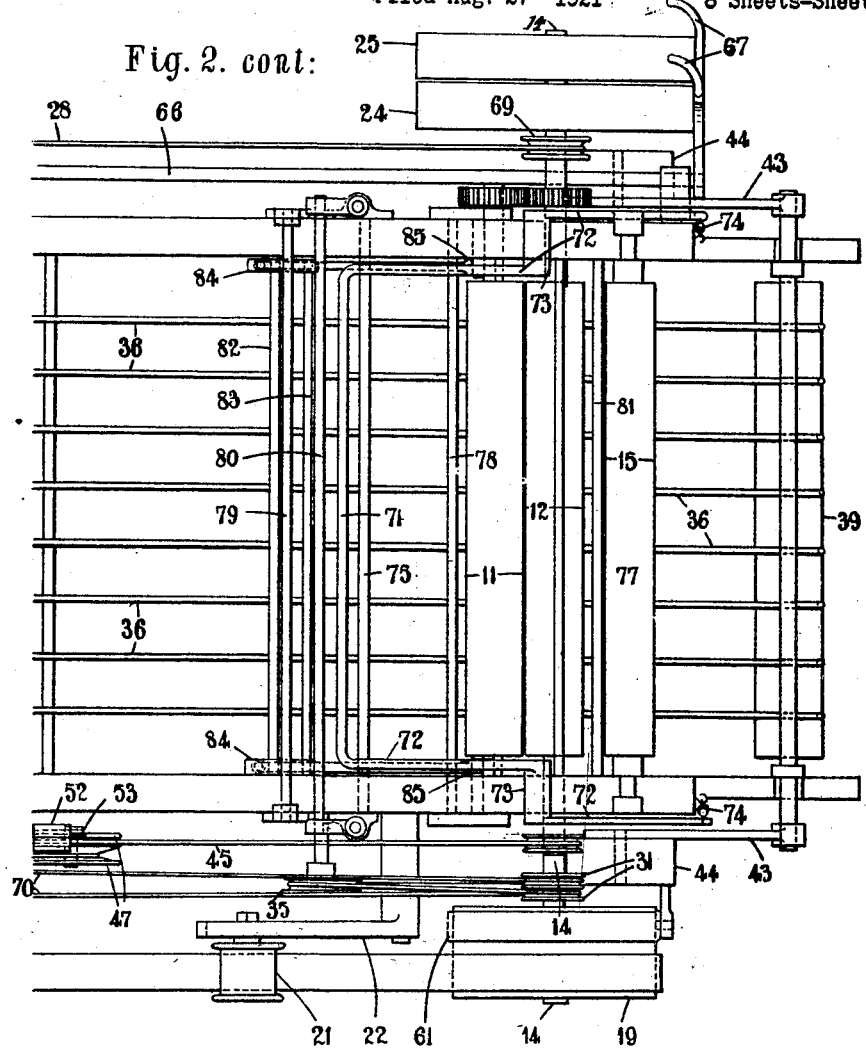
Figure 3:
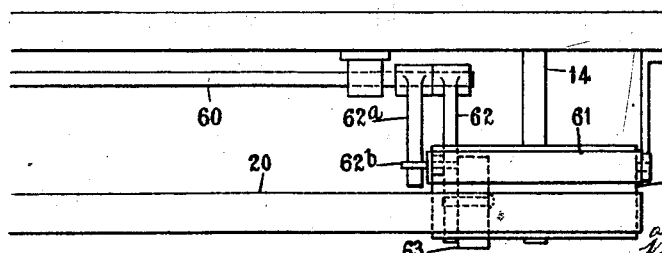
Figures 4, 7:
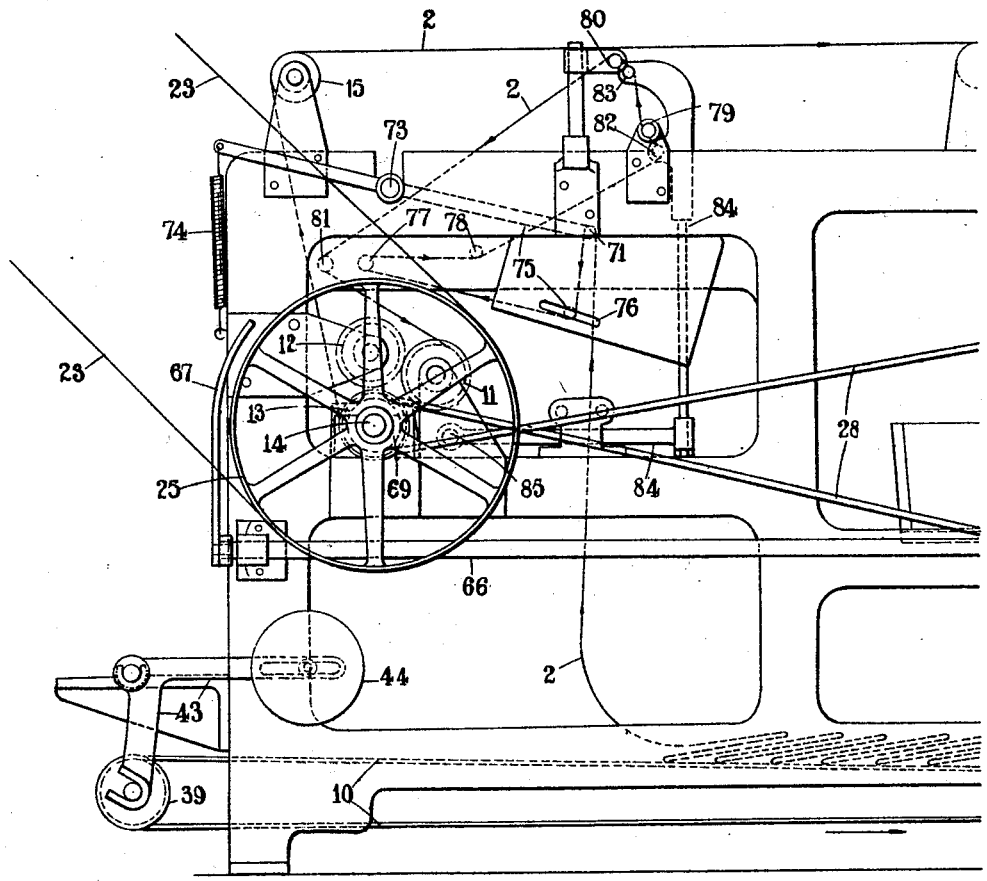
Figure 4:
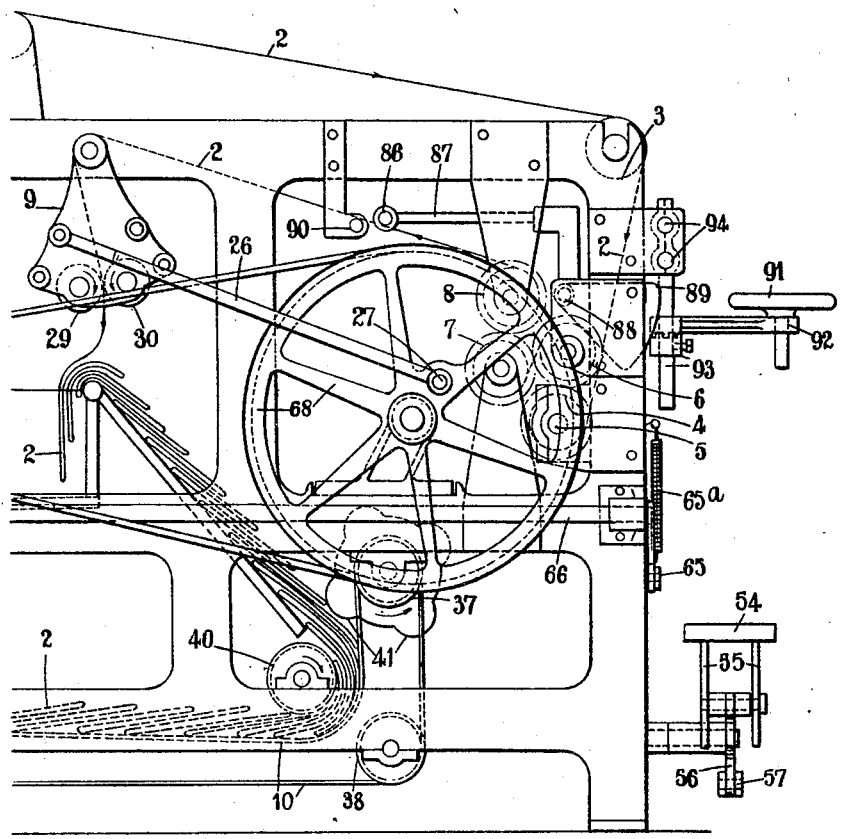
Figure 5:
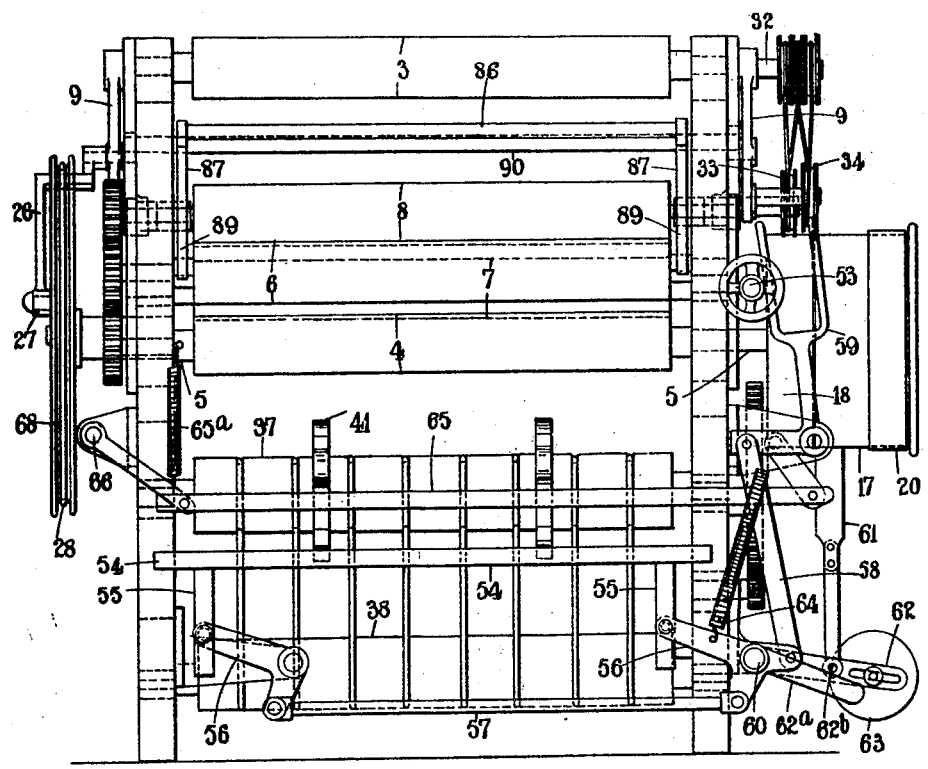
Figure 6:
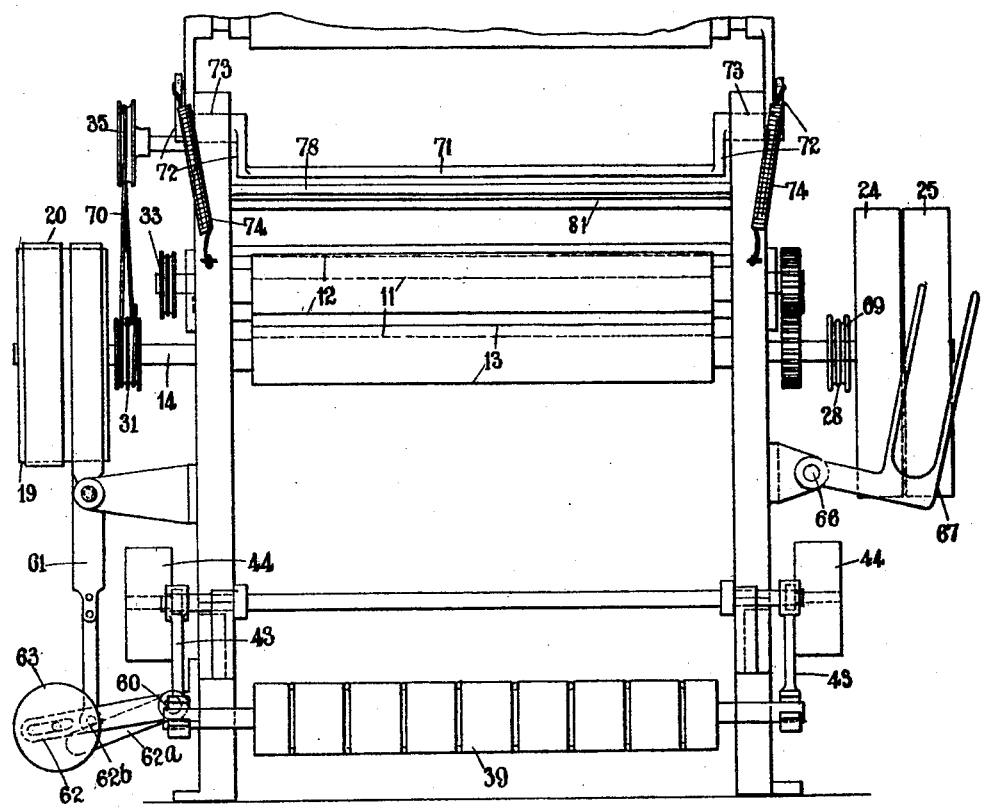

In the accompanying drawings, Fig. 1 is a side elevation of one construction or arrangement of machine embodying our improvements, Fig. 2 a plan thereof, Fig. 3 a part plan view, Fig. 4 an elevation of the other side of the machine, Fig. 5 a front view of the machine, Fig. 6 a rear view thereof and Fig. 7 a fragmentary front view illustrating a detail.

Referring to the drawings, the fabric 2 passes from the roller 3 at the front of the machine over a roller 4 on the front shaft 5 whence it passes over rollers 6, 7, 8 (which are connected with the shaft 5 by a train of gearing) to the pendulum pleating or folding device 9 whereby it is arranged in pleats or folds which pass to the creeper 10 whereby the pleats or folds are reversed. After leaving the creeper and passing over the stationary and movable rollers or bars hereinafter described, the fabric passes over rollers 11, 12 and a roller 13 on the back shaft 14 (with which the rollers are connected by a train of gearing) at the rear of the machine from which rollers it passes to the top roller 15 when it returns to the front of the machine passing on its way over a guide roller 15'.

The forward travel of the fabric (indicated by the arrow heads) is effected by the roller 4 on the front shaft 5 which is driven through a belt 16 and fast and loose pulleys 17, 18 or a clutch; and the subsidiary motions in the forward travel of the fabric are driven from a back shaft 14 which carries the roller 13. The back shaft 14 carries a pulley 19 connected with the fast pulley 17 on the front shaft 5, by a belt 20 which is unable in its forward travel to overcome the load on the back shaft 14 and drive the same when there is any slack in the upper run of the fabric between the drawing roller 4 on the front shaft 5 and the roller 13 on the back shaft 14. Preferably, the belt 20 is slightly slack and is acted upon by a jockey pulley 21 or equivalent carried by a pivoted lever 22 which is so arranged that the jockey pulley 21 or equivalent tightens the belt 20 in the forward movement and slackens it in the backward movement. At the other side of the machine, the back shaft 14 is also driven through a belt 23 and fast and loose pulleys 24, 25, or a clutch, for reversing the upper run of the fabric when required.

The pleating or folding device 9 is oscillated by a connecting rod 26 and a crank pin 27 on a pulley 68 mounted at the front of the machine and driven from the back shaft 14 by a pulley 69 thereon and a crossed rope 28. The rollers 29, 30 of the pleating or folding device are driven from the back shaft 14 by a rope 70 which passes from a pulley 31 thereon to a pulley on the shaft 32 whereon the pleating or folding device swings, thence round a pulley 34 on the shaft of the roller 30, round another pulley on the shaft 32, round a pulley 33 on the shaft of the roller 29, round a third pulley on the shaft 32 to the pulley 31 when it passes round a pulley 35 back to the pulley 31.

The creeper 10 comprises a series of endless ropes or the like 36 (Fig. 2) passing over appropriately grooved rollers 37, 38, 39 and 40. The roller 37 has mounted on it a number of cam-like discs 41 for straightening out the pleats or folds as they descend an incline 42 and guiding them round the roller 40 which delivers the pleats or folds to the creeper. The rear roller 39 of the creeper is mounted in bearings carried by one arm of bell crank levers 43 the arms of which carry adjustable weights 44, or are acted upon by adjustable springs, to adjust the tension of the ropes 36 as required. The creeper may, if desired, be constituted by a single endless rope or the like appropriately wound over the rollers 37—40 instead of by a number of ropes or the like.

The creeper is driven from the shaft of the roller 12 which is geared with and driven by the back shaft 14. Preferably, and as illustrated, the creeper is driven by two belts 45, 46, through the intervention of expanding double V pulley 47, whereby its speed can be varied as desired, a pulley 48, toothed pinion 49 and a gear wheel 50 on the shaft of the roller 37. The expanding double V pulley 47 is of the known kind comprising fixed outer members and an intermediate axially slidable member. The pulley is carried by an angular adjustable arm 51, or in a rectilinearly adjusted bearing block or the like, by the adjustment of which, conveniently by a nut 52 and a rod 53 having a screw threaded portion co-acting therewith, the effective diameters of the two portions of the pulley with which the belts 45, 46 engage can be varied.

The foot treadle 54 which is depressed by the operator while the machine is running is carried by brackets 55 pivoted to the arms of bell-crank levers 56 the other arms of which are connected by a link 57. One of the bell crank levers 56 (see Figs. 3 and 5) is also connected by a link 58 to a belt shifter 59, or a clutch operating member, and is fixed on the front end of a rock shaft 60 which at its rear end has loosely mounted on it an arm 62 connected to and adapted to operate a brake band 61 acting upon the pulley 19 on the back shaft 14, and also carrying an adjustable weight 63 which tends to apply the brake. The shaft 60 also has mounted on it a fixed arm 62$^a$ adapted to co-act with a pin 62$^b$ on the loose arm 62 to lift the latter to release the brake 61. The said bell crank lever 56 is also acted upon by a spring 64 under the influence of which the lever tends to operate the belt shifter, or clutch operating member, to move the belt to the loose pulley 18, or disengage the clutch, and to rock the shaft 60 to apply the brake 61. On the depression of the foot treadle the brake 61 is released and the driving belt 16 moved on to the fast pulley 17, or the clutch is engaged, and the machine started, while on the release of the treadle the belt 16 is moved on to the loose pulley 18, or the clutch is disengaged, and the brake 61 is applied and the machine is stopped. Instead of employing a single brake sufficiently powerful to effect the quick stopping of the machine, we may employ two or more less powerful brakes adapted to come into operation in quick succession so as to first retard and then stop the machine and thus reduce the strain on the fabric and the liability to tearing by a too sudden stopping.

The reversal of the machine is effected by the depression of a cross member 65 after the release of the foot treadle 51 to rock a shaft 66 to operate the belt shifter 67 to move the belt 23 from the loose pulley 25 (whereon it is normally kept by the holding up of the cross member 65 by a spring 65$^a$) to the fast pulley 24.

From the uptake from the creeper 10 the fabric passes over a cross bar 71, carried by levers 72 pivoted at 73 and having their other ends acted upon by spring 74 which tend to raise the bar 71, to a roller 75 mounted in inclined slots 76 in the machine framing, and thence over bars or rollers 77, 78, 79, 80 and 81, also mounted in the machine framing, and rollers or bars 82, 83 mounted in a frame 84 pivoted at 85. The frame 84 is normally maintained in the position shown by the tension of the fabric, but on the travel of the latter being reversed the frame falls or swings on its pivots 85 and in so doing carries the stretch of fabric between the bar or roller 77 and the frame or roller 83 across the bar 71, thus bringing two oppositely travelling portions of the fabric into contact with each other and ensuring the taking up by the frame of the slack or accumulation due to reversal, without drawing fabric from the pleats or folds on the creeper.

In order to take up the slack in the fabric which occurs between the pleating or folding device and the roller 8 on reversal of the travel of the fabric the latter passes from the said roller below a bar 86 carried by arms 87 pivoted at 88 and partially balanced by weights 89, or if desired acted upon by springs. From the bar 86 the fabric passes above a bar 90 to the pleating device 9. The bar 86 is normally held raised as shown by the tension on the fabric but when the travel is reversed the arms 87 fall or swing on their pivots 88 and the bar 86 takes up the slack.

By driving the subsidiary motions of the machine from the back shaft 14, instead of as hitherto from the front or pulling shaft 5, the latter shaft is relieved of a number of parts which increases the momentum thereof and causes over-running of the fabric on quick stopping, and by arranging that the fabric shall serve as part of the means of driving the back shaft from the front shaft, the subsidiary motions do not on restarting after reversal, come into operation again until any slack in the upper run of the fabric has first been taken up. Further, as the rollers of the pleating or folding device are in driving connection with the back shaft on which the brake acts, they are arrested a short space of time before the front or drawing rollers 4—8 are arrested, with the effect that the stretch of fabric between the front rollers and the pleating or folding device becomes slack. This reduces the grip or pull of the front rollers on the fabric and prevents the latter from being torn in spite of the brake or brakes.

A seat may be provided at the front of the machine for the operator. Conveniently and as shown in Fig. 7 the seat 91 may pivot in or on an arm 92 angularly adjustable in a support 93 slidably mounted on cross bars 94 at the front of the machine. The arm 92 and its support 93 may be castellated or be formed with equivalent projections and recesses or other means for retaining the arm in the desired angular position.

What we claim as our invention, and desire to secure by Letters Patent is:—

1. In a machine of the class described, a series of fabric guiding rolls over which a fabric traverses, means to drive one of said rolls, a subsidiary motion shaft carrying a second of said rolls and movable therewith, driving means for the subsidiary motion shaft operable by the motion of the driving roll and tending to operate the motion shaft, said driving means comprising a belt capable of being loosened and tightened under the influence of tension conditions in the fabric and being arranged to normally permit movement of the driving roll without effecting movement of the subsidiary motion shaft, said subsidiary motion shaft being movable by the movement of the fabric.

2. In a machine of the class described, a series of rolls arranged to support a fabric, one of said rolls constituting a drive roll and a second of said rolls constituting a driven roll, said driving roll being arranged to cause travel of the fabric around the driven roll, said driven roll being arranged to rotate upon tension being exerted upon the fabric between the driving and driven roll, and means operatively connecting the driving and driven rolls, and arranged to prevent excess tension on the fabric.

3. In a machine of the class described, a series of rolls over which the fabric passes, one of said rolls constituting a driving roll and a second roll constituting a driven roll, said driving and driven rolls being movable the one toward and from the other, said fabric being moved by the driving roll to effect the driving of the driven roll, other means connecting the driving and driven rolls operatively and arranged to assist the fabric in driving the driven roll, and mechanism actuated by the movement of the driven roll for effecting operation on said fabric.

4. In a machine of the class described, a series of rolls over which the fabric passes, one of said rolls constituting a driving roll and a second roll constituting a driven roll, said driving and driven rolls being movable the one toward and from the other, said fabric being moved by the driving roll to effect the driving of the driven roll, other means connecting the driving and driven rolls operatively and arranged to assist the fabric in driving the driven roll, mechanism actuated by the movement of the driven roll for effecting operation on said fabric, and a brake operating on the driven roll for effecting stoppage of the machine.

5. In a machine of the class described, a creeper including a guide member, a roller adjacent the guide member, and a series of cam-like disks carried by the roller and engaging the folds of a plaited fabric passing over the guide members.

In witness whereof we have hereunto set our hands.

OSCAR DREY.
HUGH LINLEY BYRD.